United States Patent
Lott et al.

(10) Patent No.: US 6,467,273 B1
(45) Date of Patent: Oct. 22, 2002

(54) METHOD FOR PRODUCING ELECTRICAL POWER

(76) Inventors: Henry A. Lott, 818 Sugar Creek Blvd., Sugarland, TX (US) 77478; John B. Goss, 1703 Earl of Dunmore, Katy, TX (US) 77449

( * ) Notice: Subject to any disclaimer, the term of this patent is extended or adjusted under 35 U.S.C. 154(b) by 34 days.

(21) Appl. No.: 09/797,392

(22) Filed: Mar. 1, 2001

(51) Int. Cl.[7] .............................................. F02G 3/00
(52) U.S. Cl. ........................................ 60/780; 60/39.12
(58) Field of Search ............................ 60/780, 39.12; 123/3; 429/17

(56) References Cited

U.S. PATENT DOCUMENTS

| | | |
|---|---|---|
| 1,712,992 A | 5/1929 | Hermann |
| 1,988,456 A | 1/1935 | Lysholm |
| 2,476,031 A | 7/1949 | Farkas et al. |
| 3,101,592 A | 8/1963 | Robertson et al. |
| 3,238,719 A | 3/1966 | Harslem |
| 3,328,957 A | 7/1967 | Rose |
| 4,003,345 A | 1/1977 | Bradley |
| 4,148,185 A | 4/1979 | Somers |
| 4,369,737 A | 1/1983 | Sanders et al. |
| 4,474,140 A | 10/1984 | Sternfeld et al. |
| 4,567,857 A * | 2/1986 | Houseman et al. ............ 123/3 |
| 4,838,027 A | 6/1989 | Rosado et al. |
| 4,838,029 A | 6/1989 | Gleason |
| 4,932,204 A | 6/1990 | Pavel |
| 4,974,412 A | 12/1990 | Schneider |
| 5,181,381 A | 1/1993 | Gounder |
| 5,255,504 A | 10/1993 | Hodrien et al. |
| 5,255,507 A | 10/1993 | Gounder |
| 5,265,410 A | 11/1993 | Histonne |
| 5,269,130 A | 12/1993 | Finckh |
| 5,282,354 A | 2/1994 | Keller |
| 5,284,013 A | 2/1994 | Keller |
| 5,622,043 A | 4/1997 | Humphries, Jr. |
| 5,634,327 A | 6/1997 | Kamber et al. |
| 5,640,840 A | 6/1997 | Briesch |
| 5,640,842 A | 6/1997 | Bronicki |
| 5,660,037 A | 8/1997 | Termuehlen |
| 5,669,216 A * | 9/1997 | Ankersmit et al. ......... 60/39.12 |
| 5,704,206 A * | 1/1998 | Kaneko et al. ............ 60/39.12 |
| 5,775,091 A | 7/1998 | Bannister et al. |
| 5,950,418 A | 9/1999 | Lott et al. |
| 6,165,633 A * | 12/2000 | Negishi ........................ 429/17 |
| 6,178,735 B1 | 1/2001 | Frutschi |
| 6,195,998 B1 | 3/2001 | Hansen et al. |
| 6,202,400 B1 | 3/2001 | Utamura |
| 6,205,762 B1 | 3/2001 | Uematsu |
| 6,212,871 B1 | 4/2001 | Rakhmailov |
| 6,212,872 B1 | 4/2001 | Abe et al. |
| 6,212,873 B1 | 4/2001 | Sugishita |
| 6,220,013 B1 | 4/2001 | Smith |
| 6,220,014 B1 | 4/2001 | Wada et al. |
| 6,223,519 B1 * | 5/2001 | Basu et al. ................ 60/39.12 |
| 6,223,520 B1 | 5/2001 | Kita |
| 6,223,522 B1 | 5/2001 | Iijima |
| 6,338,239 B1 * | 1/2002 | Hirata et al. .............. 60/39.12 |

* cited by examiner

Primary Examiner—Michael Koczo
(74) Attorney, Agent, or Firm—Guy McClung

(57) ABSTRACT

A method for producing electrical power, the method, in certain aspects, including producing a water/methanol mixture, feeding the water/methanol mixture to apparatus for converting said mixture to a feed stream, the feed stream including hydrogen, carbon dioxide, and steam, combusting the feed stream to produce a stream for powering a turbine, feeding the stream to the turbine to power the turbine, and driving an electrical generator with the turbine to produce electricity.

5 Claims, 2 Drawing Sheets

METHOD FOR PRODUCING ELECTRICAL POWER

BACKGROUND OF THE INVENTION

1. Field of the Invention

This invention, in certain aspects, is directed to power systems; such plants that use methanol in a feedstock; and to methods using such systems to produce electricity.

2. Description of Related Art

The prior art discloses a wide variety of plants and apparatuses for generating electricity using gas turbines. U.S. Pat. No. 4,148,185 discusses the generation of power from the combustion of hydrogen and oxygen cryogenic propellants for the electrolytic release of hydrogen from water to produce oxygen which can also be stored for subsequent combustion to generate power when needed. The separately stored oxygen and hydrogen are combusted together in the presence of a combustion flame coolant (water) to develop a motive fluid (steam) which is first passed through a heat exchanger and then to a turbine inlet. The motive fluid is exhausted from the turbine and reheated in the heat exchanger via the first passage therethrough and then delivered to the inlet of a second turbine. It is then exhausted into a condenser producing waste heat with a portion being re-introduced into the combustor for again cooling the combustion process. Such a system has a motive fluid inlet temperature of 2100° F. or above (a typical gas turbine inlet temperature), the inlet temperature to the preceding heat exchanger is at least as high as the initial inlet temperature to the first turbine plus the temperature rise required in the heat exchanger to raise the exhaust motive fluid from the first turbine to the inlet temperature of the second turbine. With the present turbine inlet temperatures being in the range of 2100°, the heat exchanger inlet temperature is up to 3,000° F. This temperature requirement places design restrictions on the heat exchanger that are difficult to accommodate economically and still provide the long-life expected of equipment in power generating systems.

U.S. Pat. No. 4,148,185 discloses a gas turbine power generation system using high pressure hydrogen and oxygen as the fuel for the gas turbines with the combustion process cooled by the introduction of water or steam so that the combustion temperature range is acceptable. A series of gas turbine engines are connected in series-flow communication so that the reheat of the motive fluid (the combustion of oxygen and hydrogen producing a motive fluid of steam) for the second and subsequent turbines of the system is accomplished by directing the exhaust steam of the preceding turbine into the next downstream combustor wherein the steam is reheated by the combustion therein to the next turbine inlet temperature. Such reheating process can continue for sufficient stages until the pressure of the steam exhaust is at generally atmospheric pressure. The steam is finally exhausted through a heat exchanger to pre-heat the pressurized coolant water to at least partially convert it to steam (which conversion is completed by the combustion in the first combustion chamber or by a two-stage combustion therein) for entry into the initial combustor to cool the combustion process. The use of the combination reheat and the exhaust recuperation in the gas turbine system with hydrogen and oxygen as the combustion fuels maintains the temperature on the various parts, including the rotating members of the turbine engines, within acceptable limits for long-life operation and also increases the efficiency of the over-all power generation system.

U.S. Pat. No. 5,622,043 discloses an electric power generation with a gas turbine subsystem free of a compressor; a compressor subsystem with an air heater remote from the gas turbine subsystem having an inlet receiving air and an outlet furnishing heated compressed air after heating by the air heater; and a compressed air line interlinking the outlet and said gas turbine subsystem; the gas turbine subsystem having a plenum connected to the compressed air line; a burn chamber having a compressed air inlet connected to the plenum and a fuel inlet; a gas expander connected to the burn chamber; and an electrical generator connected to the gas expander; a steam generator having a heat inlet connected to the gas expander and a steam outlet; a first steam turbine having a steam inlet connected to the steam outlet; and a drive shaft connected to the electrical generator.

SUMMARY OF THE PRESENT INVENTION

The present invention, in certain embodiments, discloses a system and method for producing electrical power, the method, in certain aspects, including feeding a mixture of water and methanol to a vaporizer, forming vapor with the vaporizer, the vapor including vaporized water and methanol, feeding vapor to a reformer, the reformer forming a first exit stream, the first exit stream including hydrogen, carbon dioxide, and steam, feeding the first exit stream from the reformer to a combustor and with the combustor combusting the first exit stream, producing hot gas (e.g. hot carbon dioxide and steam) and feeding it to power a turbine, the turbine for driving an electrical generator to produce electrical power, and thus producing electrical power.

Such a system and method may include, in certain aspects, a feed mixture of water and methanol with water between 65% and 75% by volume and methanol between 25% and 35% by volume. In one particular system there are 2 gallons of water to 1 gallon of methanol. Such a system and method may include, in certain aspects, a reformer that produces a second exit stream of steam (pure water) and, in certain aspects the second exit stream is fed to another apparatus, e.g., but not limited to, a boiler that produces steam. The boiler feed is, preferably, pure water that does not need to be further purified and/or chemically treated. In other aspects, the turbine has an exhaust and heat is extracted from the exhaust of the turbine which, in one particular aspect, is applied to the reformer. The steam produced by the boiler can be used to run, e.g., a power-producing apparatus, e.g. a turbine.

It is, therefore, an object of at least certain preferred embodiments of the present invention to provide:

New, useful, unique, efficient, nonobvious systems and methods for producing electrical power;

Such apparatuses and methods which use a water/methanol mixture as an initial feed;

Such apparatuses and methods in which a stream with hydrogen, carbon dioxide, and water is combusted in a combustor associated with a power-producing turbine;

Such apparatuses and methods in which the combustor produces a stream of carbon dioxide and steam for driving a gas turbine which in turn drives an electrical generator to produce electrical power;

Such apparatuses and methods in which heat in the exhaust from a turbine is recaptured for use in the system; and Such apparatuses, systems, and methods in which pure water is produced which, in one aspect, is re-used in the system.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DETAILED DESCRIPTION OF THE INVENTION

Figure 1:
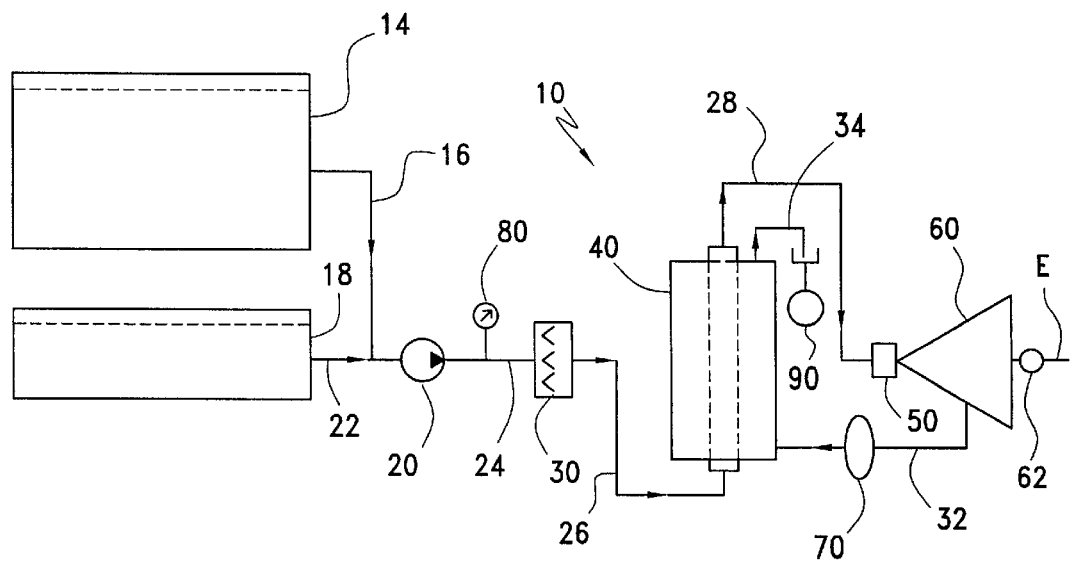
FIGS. 1–4 are schematic views of systems according to the present invention.

As shown in FIG. 1, in a system 10 according to the present invention a pump 20 pumps a mixture of water and methanol—liquid water from a tank 14 in a line 16 and liquid methanol from a tank 18 in a line 22—in a line 24 to a vaporizer 30. The vaporizer 30 vaporizes the water/methanol mixture which flows in a line 26 to a reformer 40.

The reformer 40 produces a gas mixture under pressure of hydrogen, carbon dioxide and steam which flows in a line 28 to a combustor 50. The gas mixture is combusted in the combustor 50 to produce a stream with carbon dioxide and steam. Air and/or oxygen as needed is fed to the combustor 50 (in both systems 10 and 100).

The resulting steam flows to a turbine 60 to power it. The turbine 60 drives an electrical generator 62 that produces electricity E which can be used as desired. Any known turbine used for producing electricity may be used as the turbine 60 e.g. any known gas turbine.

Hot exhaust from the turbine [gas and vapor (steam)] flows in a line 32 to the reformer 40 for use therein in producing the hydrogen/steam/carbon dioxide gas mixture that is fed to the combustor 50. Optionally additional heat as desired and/or as needed is applied to the reformer 40 (i.e. with a burner). Also optionally, a heat exchanger 70 may receive the hot exhaust from the turbine; extract heat from the hot exhaust; and such heat in an appropriate heat transfer fluid and/or with an appropriate device is then applied to the reformer 40.

In certain aspects the reformer 40 produces the gas mixture in the line 28 at between 140 and 200 p.s.i. pressure (in one aspect at about 140 p.s.i.) and at a temperature between 780 and 1000 degrees Fahrenheit (and in one aspect at about 800° F.). The reformer 40 also produces excess steam that is exhausted in a line 34 and is recovered and/or reused in the system. 23. The water/methanol vapor flowing in line 26 ranges in temperature between 68° and 77° Fahrenheit and, in one aspect, is at about 70° F. The turbine exhaust flowing in line 32 ranges in temperature between 1500 and 2100 degrees Fahrenheit (in one aspect, about 2000° F.). The vaporizer 30 is optional. In another embodiment the water/methanol mixture is sprayed into the reformer 40 (with or without a vaporizer in the system).

The pump 20, vaporizer 30, reformer 40, combustor 50, turbine 60, electrical generator 62, and heat exchanger 70 may be any known suitable commercially available models. In certain particular embodiments, the pump is a Goulds Pump 1½×⅔ Stage from Sepco Co., Houston, Tex.; the vaporizer is a Model UHY-10 from Temptrol Colo.; the reformer is a Model UK from Texfab, Inc., Cypress, Tex.; the combustor is supplied by Magnolia Services, Pasadena, Tex.; and the turbine is a General Electric turbine.

Optionally, the steam in the line 34 may be used in a boiler 90 that produces steam. This team may be used to power another apparatus and/or it can be fed back to the tank 14.

Methanol needed for startup of the turbine 60 may be fed from the tank 18 to the combustor 50 (with line 16 closed off by valve 68).

In one particular method using a system like the system 10, the enthalpy of the reformer 40 inlet steam 26 at 70° F. and 150 psia is −20,277,700 Btu/hr.; the enthalpy of the reformer exit stream 28, at 800° F. and 140.0 psia is −16,541,200 Btu/hr. The difference between these two enthalpies is the heat load of the reformer 40: 3,736,500 Btu/hr. The LHV of the H2 produced this way is 23,031,110 Btu/hr. =6,750 kW. Thus a 2MW turbine operated on this input mixture would be 29.6% efficient on a hydrogen basis, or 31.7% on a methanol basis (the LHV of methanol is 9078/lb at 77° F.).

The present invention, in certain aspects, includes the provision of methanol to a site at which natural gas is not available for running a gas turbine. Methanol is transported by boat, truck, rail and/or pipeline to such a site. Typical pumping systems may be used to convey this methanol to the pump 20 and/or vaporizer 30.

In certain aspects the feed to the combustor 50 is at the pressure at which it is generated by the reformer 40 and no extra compression is required. Alternatively, the feed to the combustor 50 may be further compressed [e.g. by a compressor] to a desired pressure for feed to the combustor 50.

In one particular method using a system 10 according to the present invention and a two megawatt ("2MW") gas turbine for the turbine 60, turbine efficiency is raised from 30% to 44%. In one comparison, 2MW's are produced by burning methanol at about 406 gallons per hour. Burning a gas mixture according to the present invention requires a flow of 358.8 gallons per hour, about a 14% gain in fuel economy.

Figure 2:
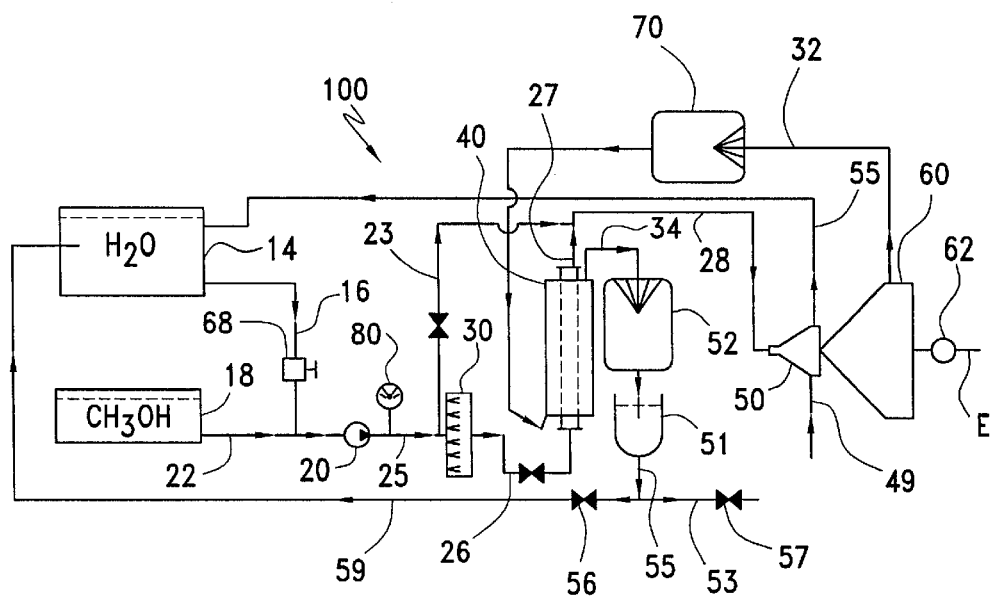

The system 100 shown in FIG. 2 has several apparatuses and devices like the system 10 in FIG. 1 and like numerals indicate the same apparatus or device.

A valve 68 in line 16 controls flow in line 16. A feed line 23 provides feed from the line 25 to the line 28 to the combustor 50 for initial start up of the turbine 60. Suitable valving is provided for both lines 23, 25, 27 and 28.

In the system 100 the excess steam in the line 34 feeds to a condenser 52 and water from the condenser 52 is stored in a tank 51. This water is pure and can be fed via lines 55, 59 to the tank 14 or via line 53 to another apparatus, e.g., but not limited to, to a steam boiler, e.g. like the boiler 90 in the system 10.

Water (preferably pure) for cooling the combustor 50 is provided in a line 49. The system 100 produces electricity as does the system 10, FIG. 1.

Figure 3:
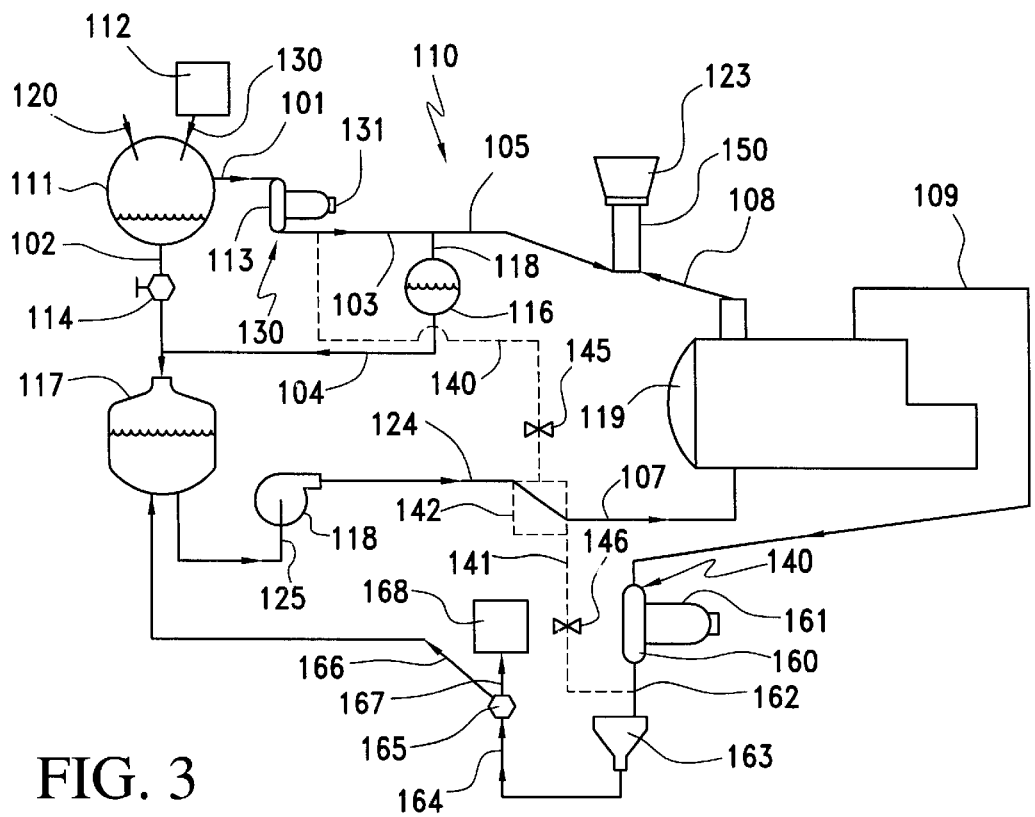

FIG. 3 shows a system 110 which is like the systems disclosed in U.S. Pat. No. 5,950,418 co-owned with the present invention and incorporated here fully by reference for all purposes; but with the addition of a system 112 that provides a feed to a combustion chamber 111 that is like the feed provided to the combustor 50 in systems 10 or 100 described above. The system 112 includes those items, apparatuses, and devices in the systems 10 or 100 for producing and providing a feed stream of hydrogen, steam, and carbon dioxide to the combustion chamber 11.

The gas turbine 113 runs an electrical generator 131 of the first turbine system 130. The electrical generator 131 produces useful electrical power and the turbine 113 exhausts hot exhaust gas which flow in a line 103 with some steam therein. The water and steam flow (e.g. by gravity) in a line 118 to a water condenser/accumulator 116. Exhaust gas flows in a line 105 to an exhaust stack 150 from which it is vented to the atmosphere or fed to a further collection/treatment system 123.

Hot water from the condenser accumulator 116 flows in a line 104 to the insulated holding tank 117. A pump 118 pumps hot water from a line 125 from the insulated holding tank 117 in a line 124 to a steam boiler 119 as needed. Exhaust gas from the boiler 119 flows in a line 108 to the exhaust stack 150 (or the boiler may have a separate exhaust system). Steam produced by the boiler 119 flows in a line 109 to a second turbine system 140 which has a steam turbine 160 and an electrical generator 161 that is run by the steam turbine 160.

The electrical generator 161 produces useful electrical power. Exhaust from the steam turbine 160 containing water and steam flows in a line 162 to a steam condenser 163. The steam condenser 163 produces water which flows in a line 164, and through a control valve/splitter 165. Water flows from the control valve/splitter 165 in a line 166 to the insulated holding tank 117. Excess water flows in a line 167 to collection apparatus 168. Pumps may be used on any line to facilitate flow where gravity is insufficient for the desired flow rate.

An optional heat scavenging system 142 may be used to scavenge heat from the turbine exhausts in lines 140 and 141. This heat is then used by the system 142 to heat water in the line 124 that is then fed to the boiler 119. With valves 145, 146 respectively, either line 140, 141 may be closed (or open) to flow.

The water produced in the combustion chamber 111 is very pure, substantially mineral/chemical free (as is water produced in the systems of FIGS. 1 and 2), and is, preferably, used throughout the system to reduce corrosion and mineral deposits. The exhaust in the line 103, the exhaust in the line 162 and/or a combination thereof, may be used to pre-heat the feed or feeds to the combustion chamber. These exhausts may also be used to pre-heat feed to the steam boiler 119 in the line 107. Heat may be scavenged from the lines 108 and 105 for re-use in the system 110. A steam boiler stacked pre-heater may be used to preheat water fed to the steam boiler.

The feed to the combustion chamber 111 from the system 112 in FIG. 3 may also be used to feed the line 222 in the system 100 of U.S. Pat. No. 5,950,418.

Figure 4:
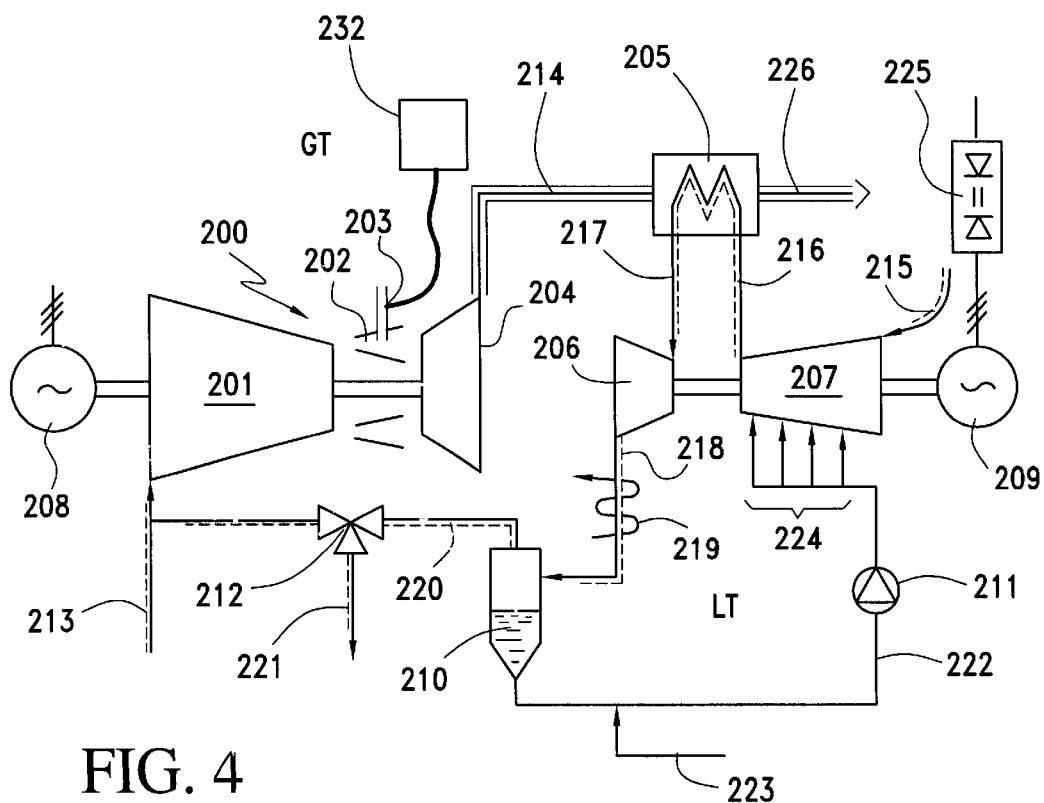

FIG. 4 shows a power plant system 200 according to the present invention. The system 200 of FIG. 4 is like systems in U.S. Pat. No. 6,178,735 B1 (incorporated fully herein for all purposes); but the system 200 has a system 232 like the system 112 (FIG. 3) and feeds a similar feed (as produced by the system 112) to a combustion chamber 202. The system 200 has a gas turbo-generator set 210 GT and also has a following open air-turbine process LT. The gas turbo-generator set itself is of conventional design: it consists of a compressor unit 201, a combustion chamber 202 operated with fuel 203 from a system 232 (like the system 112, FIG. 3), a following turbine 204 and a generator 208. Connected on the exhaust gas side of the turbine 204 is a recuperator 205 which corresponds approximately to the waste heat steam generator of a combined cycle plant. The exhaust gases 214 from the turbine 204 flow through this recuperator 205 which is operatively connected to the air-turbine process LT already mentioned, primarily to an expander turbo-generator set which consists of an expander 206, compressor 207 and generator 209. The intake air 215 to the lastmentioned expander 207, after compression, flows to the recuperator 205 and there undergoes caloric treatment by a heat exchange method, the flue gases 226 which occur as a result being discharged. The compressed air 216 from the compressor 207 flows through the recuperator 205, in which it undergoes caloric treatment before acting, as heated compressed air 217, on the expander 206. The expanded compressed air 218 then flows via a recooler 219 into a separator 10. The compressor 207 has injection cooling, so that the compressed air 216 subsequently treated per se in the recuperator 205 is moderately heated. Accordingly, the expansion of the compressed air, compressed quasi-isothermally in the compressor 207 and heated in the recuperator 205, then takes place in the expander 206 with a respectable steam content, the latter being per se. unsaturated. The differential power released at the generator 209 is only insignificantly lower than the difference between polytropic and quasi-isothermal compressor power in a conventional plant. Depending on the pressure ratio of the expander 206, a small part of the steam is already condensing out toward the end of expansion. However, at least the greater part condenses in the recooler 219 already mentioned. From the following separator 210, the recooled air 220 flowing out of the latter then leaves the process via a line 221 which is operatively connected to a regulating member 212. In order to condition, that is to say cool or preheat, the intake air 213 of the gas turbo-generator set GT, as required, part of the recooled air 220 is guided into the intake air 213. The water condensed out of the expanded air 218 is collected in the separator 210 and is fed into the compressor 207 again, via a feed pump 211, for the purpose of internal cooling 224 by evaporation. The water losses are compensated for by means of a feedwater delivery line 223. In this respect, a plurality of smaller gas turbines GT, even of different types, can cooperate with a large hot-air turbine LT. A plurality of small high-speed hot-air turbines LT can also be assigned to a high-power gas turbine GT. Their supersynchronous rotational speeds can be stabilized, for example, via a converter 225.

Any turbine or electrical generator herein may be like those disclosed in U.S. Pat. No. 5,255,504 or in prior art referred to and/or cited therein, all of which are incorporated fully herein for all purposes.

The present invention, therefore, provides in certain, but not necessarily all embodiments, a method for producing electrical power, the method including producing a water/methanol mixture, feeding the water/methanol mixture to apparatus for converting said mixture to a feed stream, the feed stream including hydrogen, carbon dioxide, and steam, combusting the feed stream to produce a stream for powering a turbine, feeding the stream to the turbine to power the turbine, and driving an electrical generator with the turbine to produce electricity; and such a method wherein the mixture contains vaporized methanol and vaporized water.

The present invention, therefore, provides in certain, but not necessarily all embodiments, a method for producing electrical power, the method including feeding a mixture of water and methanol to a vaporizer, forming an initial stream with the vaporizer, the initial stream including water vapor and vaporized methanol, feeding the initial stream to a reformer, the reformer forming a first exit stream, the first exit stream including hydrogen, carbon dioxide, and steam, feeding the first exit stream from the reformer to a combustor and with the combustor combusting the first exit stream, producing a combustor stream with hot gas and steam, feeding the combustor stream to a turbine to power the turbine, and driving an electrical generator with the turbine to produce electrical power. Such a method may also include one, some (in any possible combination) or all of the following: wherein the mixture of water and methanol contains water between 65% and 75% by volume and methanol between 25% and 35% by volume; wherein the reformer produces a second exit stream of steam; wherein the second exit stream is fed to another apparatus; wherein the another apparatus is a boiler that produces steam, the method further including producing steam with the boiler; wherein the turbine has an exhaust and the method further includes extracting heat from the exhaust of the turbine; and/or applying heat extracted from the exhaust of the turbine to the reformer.

The present invention, therefore, provides in certain, but not necessarily all embodiments, a system for producing electrical power, the system including apparatus for producing an initial stream with methanol and water; apparatus for vaporizing the initial stream producing a vapor stream therefrom; apparatus for reforming the vapor stream to produce a reformed stream, the reformed stream including hydrogen, carbon dioxide, and steam; apparatus for combusting the reformed stream to produce a power stream for driving a turbine, and apparatus for producing electricity, the apparatus for producing electricity powered by the power stream; such a system wherein the apparatus for producing electricity includes a gas driven turbine and an electrical generator driven by the gas driven turbine; and/or such a system wherein the power stream comprises carbon dioxide and steam.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112.

What is claimed is:

1. A method for producing electrical power the method comprising feeding a mixture of water and methanol to a vaporizer, forming an initial stream with the vaporizer, the initial stream comprising water vapor and methanol, feeding the initial stream to a reformer, the reformer forming a first exit stream, the first exit stream comprising hydrogen, carbon dioxide, and steam, feeding the first exit stream from the reformer to a combustor and with the combustor combusting the first exit stream, producing a combustor stream with hot gas and steam, feeding the combustor stream to a turbine to power the turbine, driving an electrical generator with the turbine to produce electrical power, wherein the reformer produces a second exit stream comprising steam, wherein the second exit stream is fed to another apparatus, and wherein the another apparatus is a boiler that produces steam, and producing steam with the boiler.

2. The method of claim 1 wherein the mixture of water and methanol contains water between 65% and 75% by volume and methanol between 25% and 35% by volume.

3. The method of claim 2 wherein the turbine has an exhaust and the method further comprising extracting heat from the exhaust of the turbine.

4. The method of claim 3 further comprising applying heat extracted from the exhaust of the turbine to the reformer.

5. The method of claim 1 wherein the hot gas includes carbon dioxide.

* * * * *